US007085685B2

(12) United States Patent
Poluzzi et al.

(10) Patent No.: US 7,085,685 B2
(45) Date of Patent: Aug. 1, 2006

(54) DEVICE AND METHOD FOR FILTERING ELECTRICAL SIGNALS, IN PARTICULAR ACOUSTIC SIGNALS

(75) Inventors: Rinaldo Poluzzi, Milan (IT); Alberto Savi, San Donato Milanese (IT); Giuseppe Martina, Milan (IT); Davide Vago, Saronno (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 236 days.

(21) Appl. No.: 10/650,450

(22) Filed: Aug. 27, 2003

(65) Prior Publication Data

US 2005/0033786 A1 Feb. 10, 2005

(30) Foreign Application Priority Data

Aug. 30, 2002 (EP) ................................ 02425541

(51) Int. Cl.
*G06F 15/00* (2006.01)

(52) U.S. Cl. ...................... 702/190; 702/189; 702/127; 708/300; 708/303; 706/1; 706/4; 706/8; 700/50

(58) Field of Classification Search ................ 702/189, 702/190, 127; 708/300–303; 706/1, 4, 8, 706/14; 700/50
See application file for complete search history.

(56) References Cited

U.S. PATENT DOCUMENTS 5,594,835 A * 1/1997 Rahman et al. ................ 706/2
5,606,646 A * 2/1997 Khan et al. ..................... 706/2
5,875,284 A * 2/1999 Watanabe et al. .............. 706/2

FOREIGN PATENT DOCUMENTS

EP 1 211 636 A1 6/2002

OTHER PUBLICATIONS

Russo, 'Nonlinear Filtering of Noisy Images Using Neuro-Fuzzy Operators', 1997, IEEE Publication, pp. 412-415.*
Russo, 'Noise Removal From Image Data Using Recursive Neuro-Fuzzy Filters', Jan. 1999, IEEE Publicaton, pp. 1818-1822.*
Doyle et al., 'Multi-Sensor Data Fusion for Helicopter Guiance Using Neuro-Fuzzy Estimation Algorithms', 1995, IEEE Publication, pp. 1392-1397.*
Di Giura, M. et al., "Adaptive Fuzzy Filtering for Audio Applications Using Neuro-Fuzzy Modelization," *IEEE*, pp. 2162-2166, 1997.

(Continued)

*Primary Examiner*—Marc S. Hoff
*Assistant Examiner*—Elias Desta
(74) *Attorney, Agent, or Firm*—Lisa K. Jorgenson; Dennis M. de Guzman; Seed IP Law Group PLLC

(57) ABSTRACT

A device for filtering electrical signals has a number of inputs arranged spatially at a distance from one another and supplying respective pluralities of input signal samples. A number of signal processing channels, each formed by a neuro-fuzzy filter, receive a respective plurality of input signal samples and generate a respective plurality of reconstructed samples. An adder receives the pluralities of reconstructed samples and adds them up, supplying a plurality of filtered signal samples. In this way, noise components are shorted. When activated by an acoustic scenario change recognition unit, a training unit calculates the weights of the neuro-fuzzy filters, optimizing them with respect to the existing noise.

37 Claims, 6 Drawing Sheets

OTHER PUBLICATIONS

Lorenzelli, F. et al., "Optimization and Performance of Broadband Microphone Arrays," *Advanced Signal Processing Algorithms, SPIE* vol. 2563:158-169, Jul. 1995.

Poluzzi, R. et al., "SystemC™ Modelling of a Neuro-Fuzzy Network for Clustering of Complex Acoustic Scenarios," *ST Microelectronics*, pp. 1-5.

Poluzzi, R. et al., "Neuro-Fuzzy Clustering Techniques for Complex Acoustic Scenarios," *ST Microelectronics*, pp. 1-5.

Neuro-Fuzzy Filtering Techniques for the Analysis of Complex Acoustic Scenarios, *ST Microelectronics*, pp. 1-8.

Van Keen, B. et al., "Beamforming: A Versatile Approach to Spatial Filtering," *IEEE ASSP Magazine*, pp. 4-24, Apr. 1988.

Yao, K. et al., "Beamforming Performance of a Randomly Distributed Sensor Array System," IEEE, pp. 438-447, 1997.

* cited by examiner

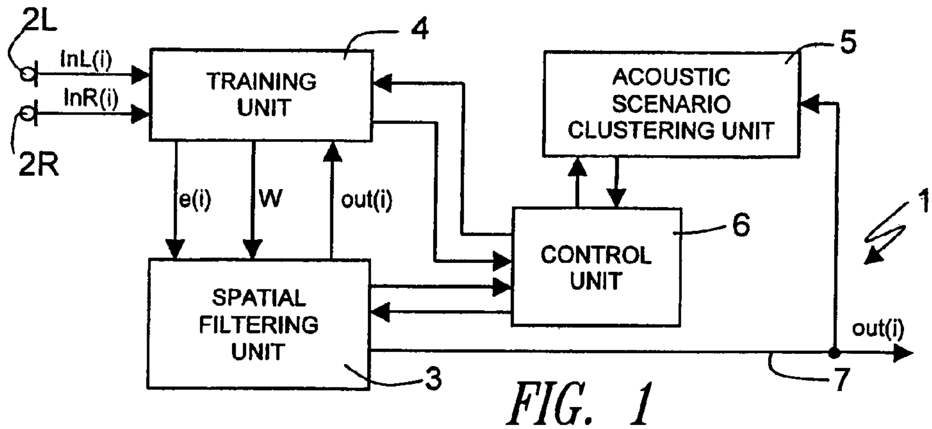
FIG. 1
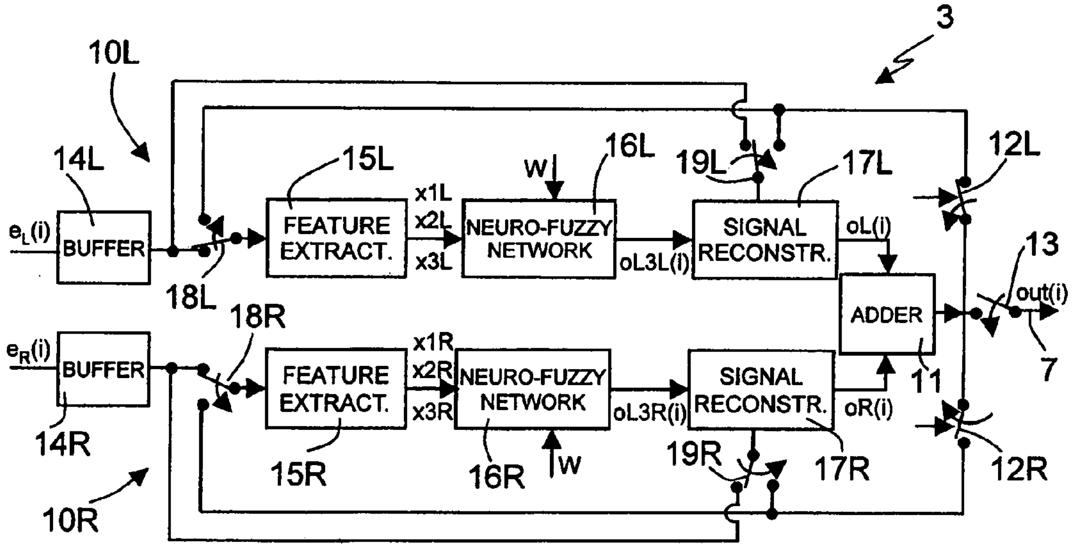
FIG. 2
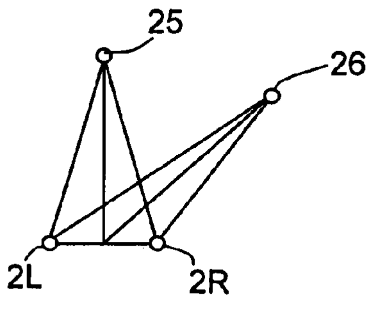
FIG. 4
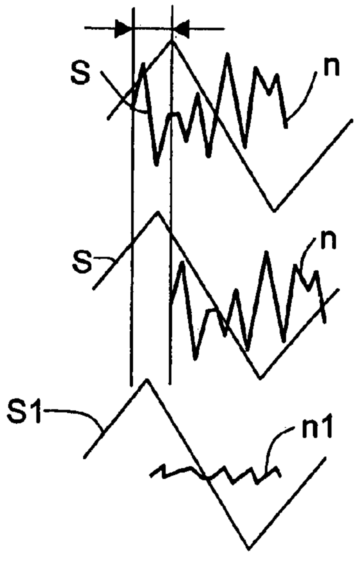
FIG. 5a
FIG. 5b
FIG. 5c

DEVICE AND METHOD FOR FILTERING ELECTRICAL SIGNALS, IN PARTICULAR ACOUSTIC SIGNALS

BACKGROUND OF THE INVENTION

1. Field of the Invention

The present disclosure relates generally to a device and method for filtering electrical signals, in particular but not exclusively acoustic signals. Embodiments of the invention can however be applied also to radio frequency signals, for instance, signals coming from antenna arrays, to biomedical signals, and to signals used in geology.

2. Description of the Related Art

As is known, in systems designed for receiving signals propagating in a physical medium, the picked signals comprise, in addition to the useful signal, undesired components. The undesired components may be any type of noise (white noise, flicker noise, etc.) or other types of acoustic signals superimposed on the useful signal.

If the useful signal and the interfering signal occupy the same time frequency band, time filtering cannot be used to separate them. Nevertheless, the useful signal and the interference signal normally arise from different locations in space. Spatial separation may therefore be exploited to separate the useful signal from the interference signals. Spatial separation is obtained through a spatial filter, i.e., a filter based upon an array of sensors.

Linear filtering techniques are currently used in signal processing in order to carry out spatial filtering. Such techniques are, for instance, applied in the following fields:

radar (e.g., control of air traffic);

sonar (location and classification of the source);

communications (e.g., transmission of sectors in satellite communications);

astrophysical exploration (high resolution representation of the universe);

biomedical applications (e.g., hearing aids).

By arranging different sensors in different locations in space, various spatial samples of one and the same signal are obtained.

Various spatial filtering techniques are known to the art. The simplest one is referred to as "delay-and-sum beamforming." According to this technique, the set of sensor outputs, picked at a given instant, has a similar role as consecutive tap inputs in a transverse filter. In this connection see B. D. Van Veen, K. M. Buckley "Beamforming: A Versatile Approach to Spatial Filtering," IEEE ASSP MAGAZINE, Apr. 1998, pages 4–24.

The most widely known filtering technique is referred to as "multiple sidelobe canceling." According to this technique, 2N+1 sensors are arranged in appropriately chosen positions, linked to the direction of interest, and a particular beam of the set is identified as main beam, while the remaining beams are considered as auxiliary beams. The auxiliary beams are weighted by the multiple sidelobe canceller, so as to form a canceling beam which is subtracted from the main beam. The resultant estimated error is sent back to the multiple sidelobe canceller in order to check the corrections applied to its adjustable weights.

The most recent beamformers carry out adaptive filtering. This involves calculation of the autocorrelation matrix for the input signals. Various techniques are used for calculating the taps of the FIR filters at each sensor. Such techniques are aimed at optimizing a given physical quantity. If the aim is to optimize the signal-to-noise ratio, it is necessary to calculate the self-values or "eigenvalues" of the autocorrelation matrix. If the response in a given direction is set equal to 1, it is necessary to carry out a number of matrix operations. Consequently, all these techniques involve a large number of calculations, which increases with the number of sensors.

Another problem that afflicts the spatial filtering systems that have so far been proposed is linked to detecting changes in environmental noise and clustering of sounds and acoustic scenarios. This problem can be solved using fuzzy logic techniques. In fact, pure tones are hard to find in nature; more frequently, mixed sounds are found that have an arbitrary power spectral density. The human brain separates one sound from another in a very short time. The separation of one sound from another is rather slow if performed automatically.

According to existing studies, the human brain performs a recognition of the acoustic scenario in two ways: in a time frequency plane, the tones are clustered if they are close together either in time or in frequency.

Clustering techniques based upon fuzzy logic are known in the literature. The starting point is time frequency analysis. For each time frequency element in this representation, a plurality of features is extracted, which characterize the elements in the time frequency region of interest. Clustering of the elements according to these premises enables assignment of each auditory stream to a given cluster in the time frequency plane.

Other techniques known in the literature tend to achieve discrimination of sounds via analysis of the frequency content. For this purpose, techniques for evaluating the content of harmonics are used, such as measurement of lack of harmony, bandwidth, etc.

BRIEF SUMMARY OF THE INVENTION

One embodiment of the present invention provides a filtering device and a filtering method that overcomes the problems of prior art solutions.

One aspect of the invention exploits the different spatial origins of the useful signal and of the noise for suppressing the noise itself. In particular, to simplify the filtering structure and to reduce the amount of calculations to be performed, the signals picked up by two or more sensors arranged as symmetrically as possible with respect to the source of the signal are filtered using neuro-fuzzy networks; then, the signals of the different channels are added together. In this way, the useful signal is amplified, and the noise and the interference are shorted.

According to another aspect of the invention, the neuro-fuzzy networks use weights that are generated through a learning network operating in real time. The neuro-fuzzy networks solve a so-called "supervised learning" problem, in which training is performed on a pair of signals: an input signal and a target signal. The output of the filtering network is compared with the target signal, and their distance is calculated according to an appropriately chosen metrics. After evaluation of the distance, the weights of the fuzzy network of the spatial filter are updated, and the learning procedure is repeated a certain number of times. The weights that provide the best results are then used for spatial filtering.

With the aim of performing a real time learning, the used window of samples is as small as possible, but sufficiently large to enable the network to determine the main temporal features of the acoustic input signal. For instance, for input signals based upon the human voice, at the sampling frequency of 11025 Hz, a window of 512 or 1024 samples (corresponding to a time interval of 90 or 45 ns) has yielded good results in one example embodiment.

According to yet a further aspect of the invention, a network is provided that is able to detect changes in the existing acoustic scenario, typically in environmental noise. The network, which also uses a neuro-fuzzy filter, is trained prior to operation and, as soon as it detects a change in environmental noise, causes activation of the training network to obtain adaptivity to the new situation.

BRIEF DESCRIPTION OF THE SEVERAL VIEWS OF THE DRAWINGS

For an understanding of the invention, there is now described one or more embodiments, purely by way of non-limiting examples and with reference to the attached drawings, wherein:

FIG. 1 is a general block diagram of an embodiment of a filtering device according to the present invention;

FIG. 2 is a more detailed block diagram of an embodiment of the filtering unit of FIG. 1;

FIGS. 4 and 5*a*–5*c* are graphic representations of the processing performed by the filtering unit of FIG. 2 according to an embodiment of the invention;

DETAILED DESCRIPTION OF THE INVENTION

Figure 3:
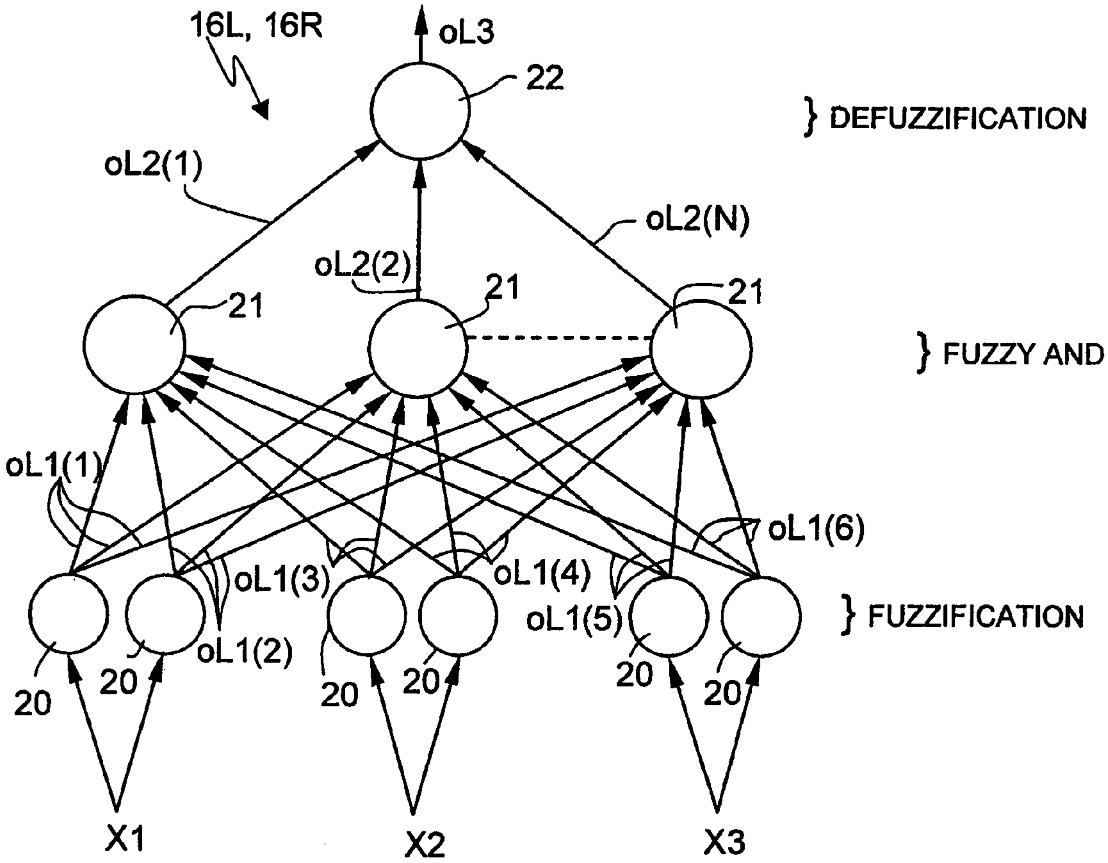
FIG. 3 represents the topology of a part of the filtering unit of FIG. 2.

Embodiments of a device and method for filtering electrical signals, in particular acoustic signals are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In FIG. 1, a filtering device 1 comprises a pair of microphones 2L, 2R, a spatial filtering unit 3, a training unit 4, an acoustic scenario clustering unit 5, and a control unit 6.

In detail, the microphones 2L, 2R (at least two, but an even larger number may be provided) pick up the acoustic input signals and generate two input signals InL(i), InR(i), each of which comprises a plurality of samples supplied to the training unit 4.

The training unit 4, which operates in real time, supplies the spatial filtering unit 3 with two signals to be filtered eL(i), eR(i), here designated for simplicity by e(i). In the filtering step, the signals to be filtered e(i) are the input signals InL(i) and InR(i), and in the training step, they derive from the superposition of input signals and noise, as explained hereinafter with reference to FIG. 7.

The spatial filtering unit 3, the structure and operation whereof will be described in detail hereinafter with reference to FIGS. 2–5, filters the signals to be filtered eL(i), eR(i) and supplies, at an output 7, a stream of samples out(i) forming a filtered signal. In particular, filtering, which has the aim of reducing the superimposed noise, takes into account the spatial conditions. To this end, the spatial filtering unit 3 uses a neuro-fuzzy network that employs weights, designated as a whole by W, supplied by the training unit 4. During the training step, the spatial filtering unit 3 supplies the training unit 4 with the filtered signal out(i). The weights W used for filtering are optimized on the basis of the existing type of noise in an embodiment. To this end, the acoustic scenario clustering unit 5 periodically or continuously processes the filtered signal out(i) and, if it detects a change in the acoustic scenario, causes activation of the training unit 4, as explained hereinafter with reference to FIGS. 8–10.

Activation and execution of the different operations for training and detecting a change in the acoustic scenario, as well as for filtering, are controlled by the control unit 6, which, for this purpose, exchanges signals and information with the units 3–5.

FIG. 2 illustrates the block diagram of the spatial filtering unit 3.

In detail, the spatial filtering unit 3 comprises two channels 10L, 10R, which have the same structure and receive the signals to be filtered eL(i), eR(i); the outputs oL(i), oR(i) of channels 10L, 10R are added in an adder 11. The output signal from the adder 11 is sent back to the channels 10L, 10R for a second iteration before being outputted as filtered signals out(i). The double iteration of the signal samples is represented schematically in FIG. 2 through on-off switches 12L, 12R, 13 and changeover switches 18L, 18R, 19L, 19R, appropriately controlled by the control unit 6 illustrated in FIG. 1 so as to obtain the desired stream of output samples. Each channel 10L, 10R is a neuro-fuzzy filter comprising, in cascade: an input buffer 14L, 14R, which stores a plurality of samples eL(i) and eR(i) of the respective signal to be filtered, the samples defining a work window (2N+1 samples, for example 9 or 11 samples); a feature calculation block 15L, 15R, which calculates signal features X1L(i), X2L(i) and X3L(i) and, respectively, X1R(i), X2R(i) and X3R(i) for each sample eL(i) and eR(i) of the signals to be filtered; a neuro-fuzzy network 16L, 16R, which calculates reconstruction weights oL3(i), oR3(i) on the basis of the features and of the weights W received from the training unit 4; and a reconstruction unit 17L, 17R, which generates reconstructed signals oL(i), oR(i) on the basis of the samples eL(i) and eR(i) of the respective signal to be filtered and of the respective reconstruction weights oL3(i).

The spatial filtering unit 3 functions as follows. Initially, the changeover switches 18L, 18R, 19L, 19R are positioned so as to supply the signal to be filtered to the feature extraction blocks 15L, 15R and to the signal reconstruction blocks 17L, 17R; and the on-off switches 12L, 12R and 13 are in an opening condition. Then the channels 10L, 10R forming neuro-fuzzy filters 16L, 16R calculate the reconstructed signal samples oL(i), oR(i), as mentioned above.

Next, the adder 24 adds the reconstructed signal samples oL(i), oR(i), generating addition signal samples according to the equation:

$$\mathrm{sum}(i)=\alpha oL(i)+\beta oR(i) \qquad (1)$$

where α and β are constants of appropriate value which take into account the system features. For example, in the case of symmetrical channels, they are equal to ½. Instead, if there exists an unbalancing (i.e., one of the two microphones 2L, 2R attenuates the signal more than does the other), it is possible to modify these constants so as to compensate the unbalancing.

Hereinafter, the addition signal samples sum(i) are fed back. To this end, the on-off switches 12L, 12R and the changeover switches 18L, 18R, 19L, 19R switch change their state. The calculation of the features X1L(i), X2L(i), X3L(i) and X1R(i), X2R(i), X3R(i), the calculation of the reconstruction weights oL3(i), oR3(i), the calculation of the reconstructed signal samples oL(i), oR(i), and their addition are repeated, operating on the addition signal samples sum (i). After addition of the reconstructed signals oL(i), oR(i) obtained in the second iteration, using the expression (1), the on-off switches 12L, 12R and 13 switch change their state, so that the obtained samples are outputted as filtered signal out(i).

The feature extraction blocks 15L, 15R operate as described in detail in the patent application EP-A-1 211 636, to which reference is made. In brief, here it is pointed out only that they calculate the time derivatives and the difference between an i-th sample in the respective work window and the average of all the samples of the window according to the following equations:

$$X1(i)=\frac{|i-N|}{N} \qquad (2)$$

$$X2(i)=\frac{|e(i)-e(N)|}{\max(diff)} \qquad (3)$$

$$X3(i)=\frac{|e(i)-av|}{\max(\mathrm{diff\_av})} \qquad (4)$$

where the letters L and R referring to the specific channel have been omitted and where N is the position of a central sample e(N) in the work window;

max(diff)=max{e(k)−e(N)} with k=0, . . . , 2N, i.e., the maximum of the differences between all the input samples e(k) and the central sample e(N);

av is the average value of the input sample e(i);

max($diff_{13}$ av)=max{e(k)−av} with k=0, . . . , 2N, i.e., the maximum of the differences between all the input samples e(k) and the average value av.

The neuro-fuzzy networks 16L, 16R are three-layer fuzzy networks described in detail in the above-mentioned patent application (see, in particular, FIGS. 3*a* and 3*b* therein), and the functional representation of which is given in FIG. 3, where, for simplicity, the index (i) corresponding to the specific sample within the respective work window is not indicated, just as the channel L or R is not indicated. The neuro-fuzzy processing represented in FIG. 3 is repeated for each input sample e(i) of each channel.

In detail, starting from the three signal features X1, X2 and X3 (or, generically, from l signal features Xl) and given k membership functions of a gaussian type for each signal feature (described by the mean value $W_m$(l,k) and by the variance $W_v$(l,k)), a fuzzification operation is performed, that is the level of membership of the signal features X1, X2 and X3 is evaluated with respect to each membership function (here two for each signal feature so that k=2; altogether M=l·k=6 membership functions are provided).

In FIG. 3, the above operation is represented by six first-layer neurons 20, which, starting from three signal features X1, X2 and X3 (generically designated as Xl) and using as weights the mean value $W_m$(l,k) and the variance $W_v$(l,k) of the membership functions, each supply a first-layer output oL1(l,k) (hereinafter also designated as oL1 (m)) calculated as follows:

$$oL1(l,k)=oL1(m)=\exp\left[-\left(\frac{Xl-W_m(l,k)}{W_v(l,k)}\right)^2\right] \qquad (5)$$

The weights $W_m$(l,k) and $W_v$(l,k) are calculated by the training network 4 and updated during the training step, as explained later on.

Next, a fuzzy AND operation is performed using the norm of the minimum so as to obtain N second-layer outputs oL2(n).

In FIG. 3, this operation is represented by N second-layer neurons 21, which implement the equation:

$$oL2(n)=\min_n\{W_{FA}(m,n)\cdot oL1(m)\} \qquad (6)$$

where the second-layer weights {$W_{FA}$(m,n)} are initialized in a random way and are not updated.

Finally, the third layer corresponds to a defuzzification operation and yields at output a reconstruction weight oL3 for each channel of a discrete type, using N third-layer weights $W_{DF}$(n), also these being supplied by the training unit 4 and updated during the training step. The defuzzification method is the center-of-gravity one and is represented in FIG. 3 by a third-layer neuron 22 yielding the reconstruction weight oL3 according to the following equation:

$$oL3=\frac{\sum_{n=1}^{N}W_{DF}(n)\cdot oL2(n)}{\sum_{n=1}^{N}oL2(n)} \qquad (7)$$

Each reconstruction unit 17L, 17R then awaits a sufficient number of samples eL(i), eR(i), respectively, and corresponding reconstruction weights oL3L(i), oL3R(i) (at least 2N+1, equal to the width of a work window) and calculates a respective output sample oL(i), oR(i) as weighted sum of the input samples eL(i−j), eR(i−j), with j=0, . . . , 2N, using the reconstruction weights oL3L(i−j), oL3R(i−j) according to the following equations:

$$oL(i) = \frac{\sum_{j=0}^{2N} oL3L(i-j)\cdot eL(i-j)}{\sum_{j=0}^{2N} eL(i-j)} \tag{8}$$

$$oR(i) = \frac{\sum_{j=0}^{2N} oL3R(i-j)\cdot eR(i-j)}{\sum_{j=0}^{2N} eR(i-j)} \tag{9}$$

Figure 9:
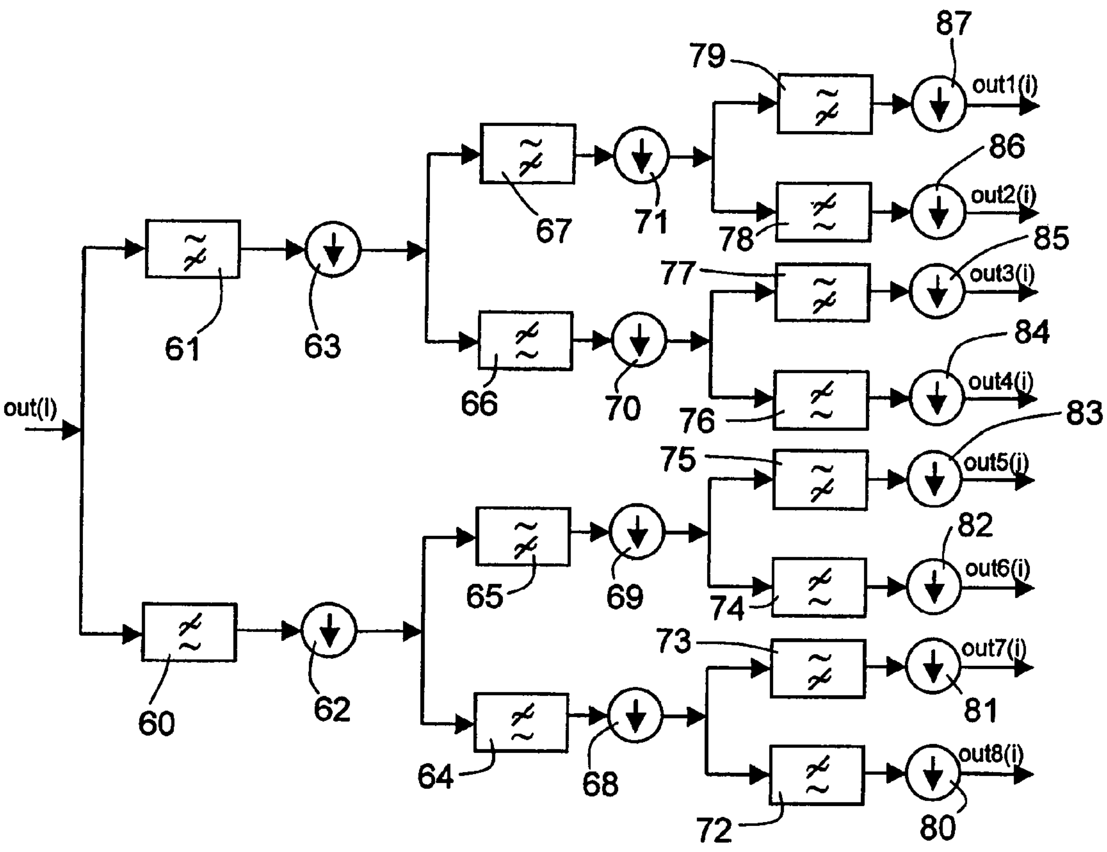
FIG. 9 is a more detailed block diagram of a block of FIG. 7.

For the precise operation of each channel 10L, 10R of the spatial filtering unit 3 and its integrated implementation, the reader is referred to FIGS. 3*a*, 3*b* and 9 of the above-mentioned patent application EP-A-1 211 636.

In practice, the spatial filtering unit 3 exploits the fact that the noise superimposed on a signal generated by a source arranged symmetrically with respect to the microphones 2L, 2R has zero likelihood of reaching the two microphones at the same time, but in general presents, in one of the two microphones, a delay with respect to the other microphone. Consequently, the addition of the signals processed in the two channels 10L, 10R of the spatial filtering unit 3, leads to a reinforcement of the useful signal and to a shorting or reciprocal annihilation of the noise.

The above behavior is represented graphically in FIGS. 4 and 5*a*–5*c*.

In FIG. 4, a signal source 25 is arranged symmetrically with respect to the two microphones 2L and 2R, while a noise source 26 is arranged randomly, in this case closer to the microphone 2R. The signals picked up by the microphones 2L, 2R (broken down into the useful signal s and the noise n) are illustrated in FIGS. 5*a* and 5*b*, respectively. As may be noted, the noise n picked up by the microphone 2L, which is located further away, is delayed with respect to the noise n picked up by the microphone 2R, which is closer. Consequently, the sum signal, illustrated in FIG. 5*c*, shows the useful signal s1 unaltered (using as coefficients of addition ½) and the noise n1 practically annihilated.

Figure 6:
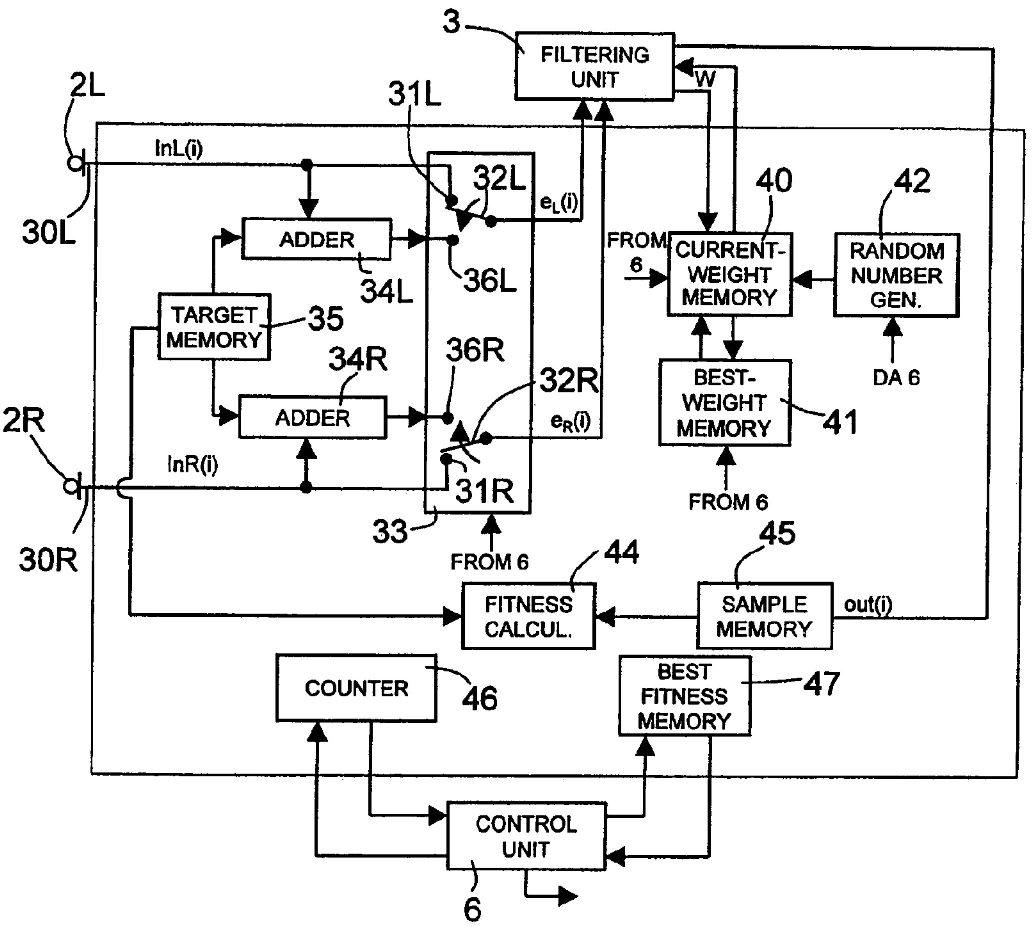
FIG. 6 is a more detailed block diagram of an embodiment of the training unit of FIG. 1.

FIG. 6 shows the block diagram of an embodiment of the training unit 4, which has the purpose of storing and updating the weights used by the neuro-fuzzy network 16L, 16R of FIG. 2.

The training unit 4 has two inputs 30L and 30R connected to the microphones 2L, 2R and to first inputs 31L, 31R of two on-off switches 32L, 32R belonging to a switching unit 33. The inputs 30L, 30R of the training unit 4 are moreover connected to first inputs of respective adders 34L, 34R, which have second inputs connected to a target memory 35. The outputs of the adders 34L, 34R are connected to second inputs 36L, 36R of the switches 32L, 32R. The outputs of the switches 32L, 32R are connected to the spatial filtering unit 3, to which they supply the samples eL(i), eR(i) of the signals to be filtered.

The training unit 4 further comprises a current-weight memory 40 connected bidirectionally to the spatial filtering unit 3 and to a best-weight memory 41. The current-weight memory 40 further receives random numbers from a random number generator 42. The current weight memory 40, the best-weights memory 41 and the random number generator 42, as also the switching unit 33, are controlled by the control unit 6 as described below.

The target memory 35 has an output connected to a fitness evaluation unit 44, which has an input connected to a sample memory 45 that receives the filtered signal samples out(i). The fitness calculation unit 44 has an output connected to the control unit 6.

Finally, the training unit 4 comprises a counter 46 and a best-fitness memory 47, which are bidirectionally connected to the control unit 6.

The target memory 35 is a random access memory (RAM) in one embodiment, which contains a preset number (from 100 to 1000) of samples of a target signal. The target signal samples are preset or can be modified in real time and are chosen according to the type of noise to be filter (white noise, flicker noise, or particular sounds such as noise due to a motor vehicle engine or a door bell). Likewise, the current-weight memory 40, the best-weight memory 41, the sample memory 45 and the best-fitness memory 47 are RAMs of appropriate sizes.

Operation of the training unit 4 is now described with reference to FIG. 7. During normal operation of the filtering device 1, the control unit 6 controls the switching unit 33 so that the input signal samples InL(i), InR(i) are supplied directly to the spatial filtering unit 3 (step 100).

As soon as the acoustic scenario clustering unit 5 detects the change in the acoustic scenario, as described in detail hereinafter (output YES from the verification step 102), the control unit 6 activates the training unit 4 in real time mode. In particular, if modification of the target signal samples is provided, the control unit 6 controls loading of these samples into the target memory 35 (step 104). The target signal samples are chosen amongst the ones stored in a memory (not shown), which stores the samples of different types of noise. The target signal samples are then supplied to the adders 34L, 34R, which add them to the input signal samples InL(i), InR(i), and the switching unit 33 is switched so as to supply the spatial filtering unit 3 with the output samples from the adders 34L, 34R (step 106). In addition, the control unit 6 resets the current-weight memory 40, the best-weight memory 41, the best-fitness memory 47 and the counter 46 (step 108). Then it activates the random number generator 42 so that this will generate twenty-four weights (equal to the number of weights necessary for the spatial filtering unit 3) and controls storage of the random numbers generated in the current-weight memory 40 (step 110).

The just randomly generated weights are supplied to the spatial filtering unit 3, which uses them for calculating the filtered signal samples out(i) (step 112). Each filtered signal sample out(i) that is generated is stored in the sample memory 45. As soon as a preset number of filtered signal samples out(i) has been stored, for example, one hundred, they are supplied to the fitness calculation unit 44 together with as many target signal samples, supplied by the target memory 35.

Next (step 114), the fitness calculation unit 44 calculates the energy of the noise samples out(i)−tgt(i) and the energy of the target signal samples tgt(i) according to the relations:

$$P_n = \sum_{i=0}^{NW} [\text{out}(i) - tgt(i)]^2 \tag{10}$$

$$P_{tgt} = \sum_{i=0}^{NW} [tgt(i)]^2 \tag{11}$$

where NW is the number of preset samples, for example, one hundred.

Next, the fitness calculation unit 44 calculates the fitness function, for example, the signal-to-noise ratio SNR, as:

$$SNR = \frac{P_{tgt}}{P_n} \qquad (12)$$

The fitness value that has just been calculated is supplied to the calculation unit 6. If the fitness value that has just been calculated is the first, it is written in the best-fitness memory 47, and the corresponding weights are written in the best-weight memory 41 (step 120).

Instead, if the best-fitness memory 47 already contains a previous fitness value (output NO from the verification step 116), the value just calculated is compared with the stored value (step 118). If the value just calculated is better (i.e., higher than the stored value), it is written into the best-fitness memory 47 over the previous value, and the weights which have just been used by the spatial filtering unit 3 and which have been stored in the current-weight memory 40 are written in the best-weight memory 41 (step 120).

At the end of the above operation, as well as if the fitness just calculated is less good (i.e., lower) than the value stored in the best-fitness memory 47, the counter 46 is incremented (step 122).

The operations of generating new random weights, calculating new filtered signal samples out(i), calculating and comparing the new fitness with the value previously stored are now repeated until the number of iterations or generations is reached. At the end of these operations (output YES from verification step 124), the weights stored as best weights in the best-weight memory 41 are rewritten in the current-weight memory 40 and used for calculating the filtered signal samples out(i) up to the next activation of the training unit 4.

Figure 8:
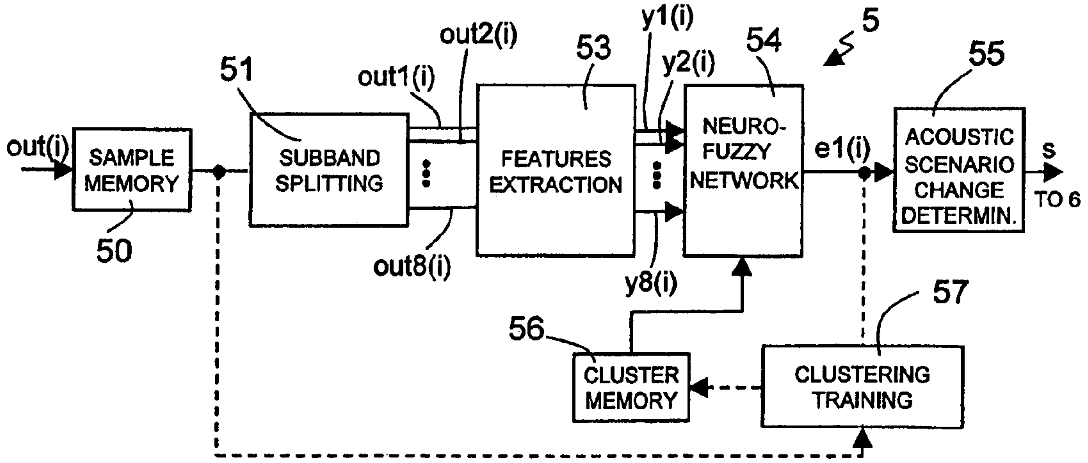
FIG. 8 is a more detailed block diagram of the acoustic-scenario clustering unit of FIG. 1.

FIG. 8 shows the block diagram of an embodiment of the acoustic scenario clustering unit 5.

The acoustic scenario clustering unit 5 comprises a filtered sample memory 50, which receives the filtered signal samples out(i) as these are generated by the spatial filtering unit 3 and stores a preset number of them, for example, 512 or 1024. As soon as the preset number of samples is present, they are supplied to a subband splitting block 51 (the structure whereof is, for example, shown in FIG. 9).

The subband splitting block 51 divides the filtered signal samples into a plurality of sample subbands, for instance, eight subbands out1(i), out2(i), . . . , out8(i), which take into account the auditory characteristics of the human ear. In particular, each subband is linked to the critical bands of the ear, i.e., the bands within which the ear is not able to distinguish the spectral components.

The different subbands are then supplied to a feature calculation block 53. The features of the subbands out1(i), out2(i), . . . , out8(i) are, for example, the energy of the subbands, as sum of the squares of the individual samples of each subband. In the example described, eight features Y1(i), Y2(i), . . . , Y8(i) are thus obtained, which are supplied to a neuro-fuzzy network 54, topologically similar to the neuro-fuzzy networks 16L, 16R of FIG. 2 and thus structured in a manner similar to what is illustrated in FIG. 3, except for the presence of eight first-layer neurons (similar to the neurons 20 of FIG. 3, one for each feature) connected to n second-layer neurons (similar to the neurons 21, where n may be equal to 2, 3 or 4), which are, in turn, connected to one third-layer neuron (similar to the neuron 22), and in that different rules of activation of the first layer are provided, these rules using the mean energy of the filtered samples in the window considered, as described hereinafter.

For filtering, the neuro-fuzzy network 54 uses fuzzy sets and clustering weights stored in a clustering memory 56.

The neuro-fuzzy network 54 outputs acoustically weighted samples e1(i), which are supplied to an acoustic scenario change determination block 55.

During training of the acoustic scenario clustering unit 5, a clustering training block 57 is moreover active, which, to this end, receives both the filtered signal samples out(i) and the acoustically weighted samples e1(i), as described in detail hereinafter.

Figure 7:
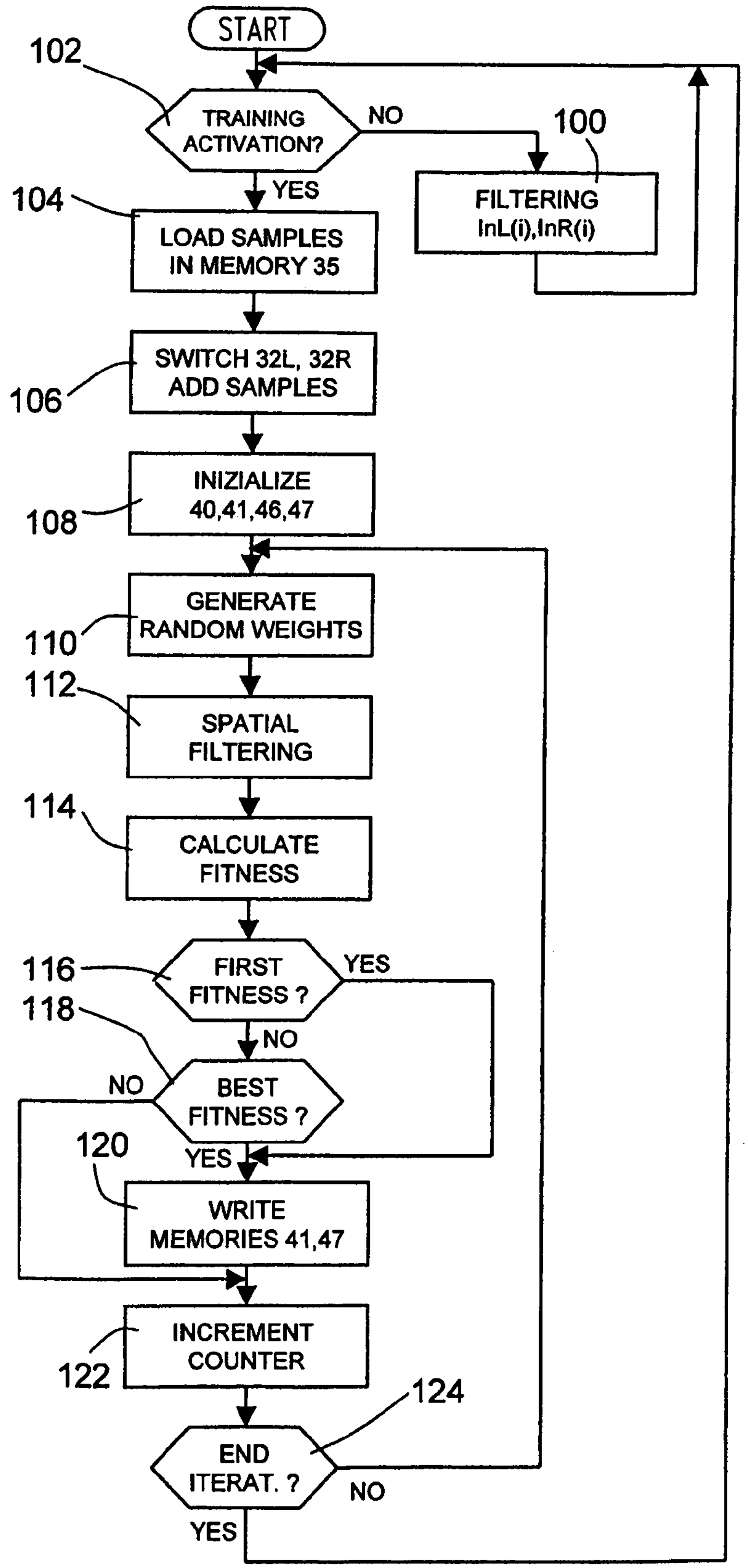
FIG. 7 is a flow-chart representing operation of the training unit of FIG. 6 according to an embodiment of the invention.

The acoustic scenario change determination block 55 is substantially a memory which, on the basis of the acoustically weighted samples e1(i), outputs a binary signal s (supplied to the control unit 6), the logic value whereof indicates whether the acoustic scenario has changed and hence determines or not activation of the training unit 4 (and then intervenes in the verification step 102 of FIG. 7).

The subband splitting block 51 uses a bank of filters made up of quadrature mirror filters. A possible implementation is shown in FIG. 9, where the filtered signal out(i) is initially supplied to two first filters 60, 61, the former being a lowpass filter and the latter a highpass filter, and is then downsampled into two first subsampler units 62, 63, which discard the odd samples from the signal at output from the respective filter 60, 61 and keep only the respective even sample. The sequences of samples thus obtained are each supplied to two filters, a lowpass filter and a highpass filter (and thus, in all, to four second filters 64, 67). The outputs of the second filters 64, 67 are then supplied to four second subsampler units 68–71, and each sequence thus obtained is supplied to two third filters, one of the lowpass type and one of the highpass type (and thus, in all, to eight third filters 72–79), to generate eight sequences of samples. Finally, the eight sequences of samples are supplied to eight third subsampler units 80–86.

Figure 10:
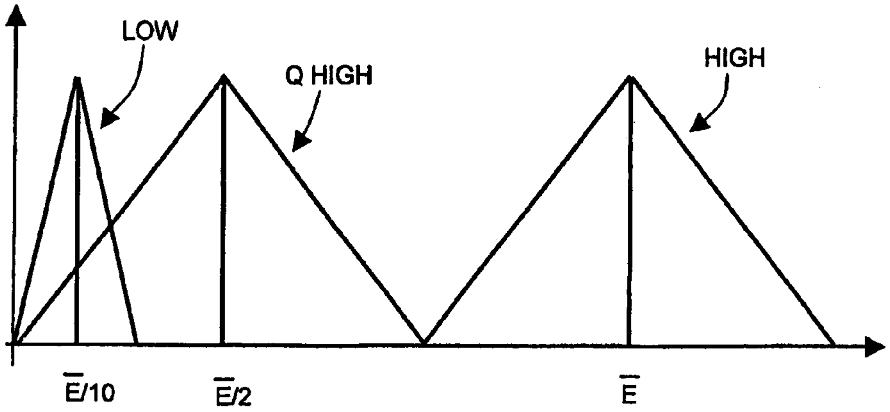
FIG. 10 shows an example form of the fuzzy sets used by an embodiment of the neuro-fuzzy network of the acoustic-scenario clustering unit of FIG. 8.

As said, the neuro-fuzzy network 54 is of the type shown in FIG. 3, where the fuzzy sets used in the fuzzification step (activation values of the eight first-level neurons) are triangular functions of the type illustrated in FIG. 10. In particular, as may be noted, the "HIGH" fuzzy set is centered around the mean value $\overline{E}$ of the energy of a window of filtered signal samples out(i) obtained in the training step. The "QHIGH" fuzzy set is centered around half of the mean value of the energy ($\overline{E}/2$) and the "LOW" fuzzy set is centered around one tenth of the mean value of the energy ($\overline{E}/10$). Prior to training the acoustic scenario clustering unit 5, the fuzzy sets of FIG. 10 are assigned to the first-layer neurons, so that, altogether, there is a practically complete choice of all types of fuzzy sets (LOW, QHIGH, HIGH). For instance, given eight first-layer neurons 20, two of these can use the LOW fuzzy set, two can use the QHIGH fuzzy set, and four can use the HIGH fuzzy set.

Analytically, the fuzzy sets can be expressed as follows:

$$\frac{10}{\overline{E}}x \quad \text{for} \quad 0 \le x \le \frac{\overline{E}}{10} \qquad (13)$$

*LOW*

$$1 - x\frac{10}{\overline{E}} \quad \text{for} \quad \frac{\overline{E}}{10} \le x \le \frac{\overline{E}}{5}$$

-continued $$\frac{2}{\overline{E}}x \quad \text{for} \quad 0 \le x \le \frac{\overline{E}}{2}$$

$$Q-HIGH$$

$$1 - x\frac{2}{\overline{E}} \quad \text{for} \quad \frac{\overline{E}}{2} \le x \le \overline{E}$$

$$\frac{2}{\overline{E}}x + \frac{\overline{E}}{2} \quad \text{for} \quad \frac{\overline{E}}{2} \le x \le \overline{E}$$

$$HIGH$$

$$\frac{\overline{E}}{2} + 1 - x\frac{2}{\overline{E}} \quad \text{for} \quad \overline{E} < x \le \frac{3}{2}\overline{E}$$

Fuzzification thus takes place by calculating, for each feature Y1(i), Y2(i), . . . , Y8(i), the value of the corresponding fuzzy set according to the set of equations 13. Also in this case, it is possible to use tabulated values stored in the cluster memory 56 or else to perform the calculation in real time by linear interpolation, once the coordinates of the triangles representing the fuzzy sets are known.

The acoustic scenario change determination block 55 accumulates or simply counts the acoustically weighted samples e1(i) and, after receiving a preset number of acoustically weighted samples e1(i) (typically equal to a work window, i.e., 512 or 1024 samples) discretizes the last sample. Alternatively, it can calculate the mean value of the acoustically weighted samples e1(i) of a window and discretize it. Consequently, if for example the digital signal s is equal to 0, this means that the training unit 4 is not to be activated, whereas, if s=1, the training unit 4 is to be activated.

The clustering training block 57 is used, as indicated, only offline prior to activation of the filtering device 1. To this end, it calculates the mean energy $\overline{E}$ of the filtered signal samples out(i) in the window considered, by calculating the square of each sample, adding the calculated squares, and dividing the result by the number of samples. In addition, it generates the other weights in a random way and uses a random search algorithm similar to the one described in detail for the training unit 4.

Figure 11:
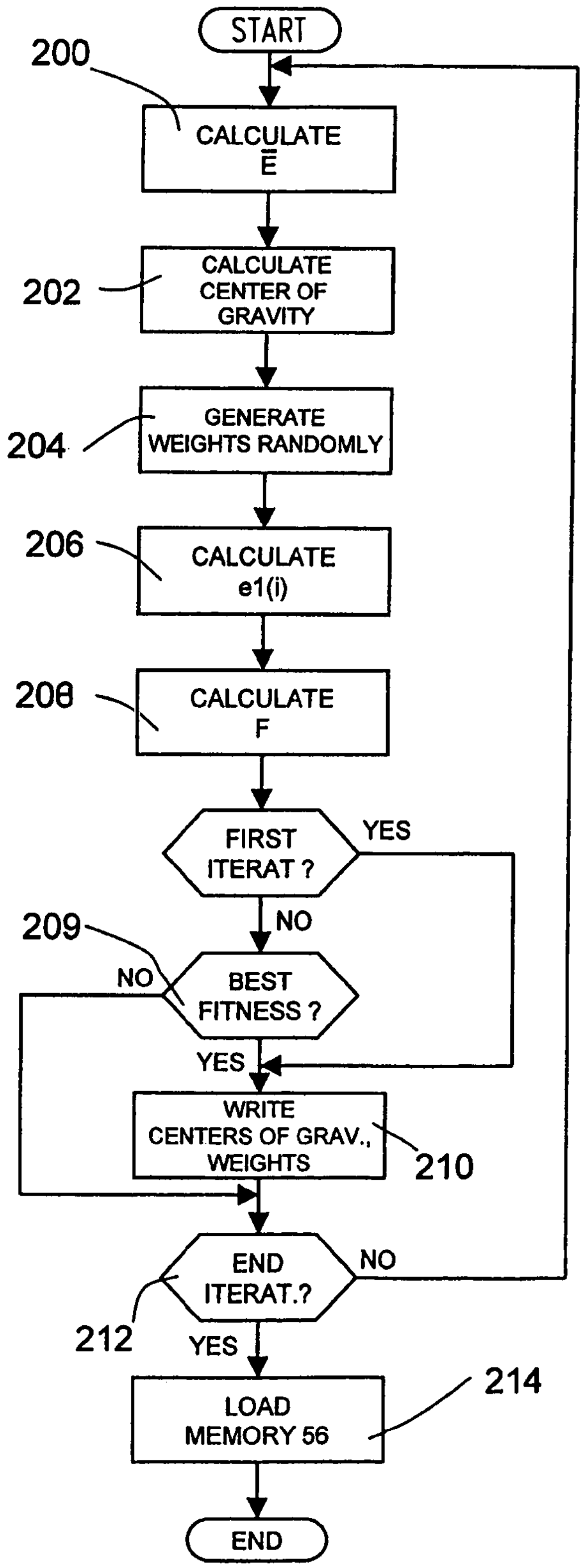
FIG. 11 is a flow-chart representing operation of a training block forming part of the acoustic-scenario clustering unit of FIG. 8 according to an embodiment of the invention.

In particular, as shown in the flowchart of FIG. 11, after calculating the mean energy $\overline{E}$ of the filtered signal samples out(i) (step 200), calculating the centers of gravity of the fuzzy sets (equal to $\overline{E}$, $\overline{E}/2$ and $\overline{E}/10$) (step 202), and generating the other weights randomly (step 204), the neuro-fuzzy network 54 determines the acoustically weighted samples e1(i) (step 206).

After accumulating a sufficient number of acoustically weighted samples e1(i) equal to a work window, the clustering training block 57 calculates a fitness function, using, for example, the following relation:

$$F = \sum_{i=1}^{N} (Tg(i) \otimes e1(i)) \tag{14}$$

where N is the number of samples in the work window, Tg(i) is a sample (of binary value) of a target function stored in a special memory, and e1(i) are acoustically weighted samples (step 208). In practice, the clustering training unit 57 performs an exclusive sum, EXOR, between the acoustically weighted samples and the target function samples.

The described operations are then repeated a preset number of times to verify whether the fitness function that has just been calculated is better than the previous ones (step 209). If it is, the weights used and the corresponding fitness function are stored (step 210), as described with reference to the training unit 4. At the end of these operations (output YES from step 212) the clustering-weight memory 56 is loaded with the centers of gravity of the fuzzy sets and with the weights that have yielded the best fitness (step 214).

The advantages of the described filtering method(s) and device(s) are the following. First, the filtering unit enables, with a relatively simple structure, suppression or at least considerable reduction in the noise that has a spatial origin different from useful signal. Filtering may be carried out with a computational burden that is much lower that required by known solutions, enabling implementation of the invention also in systems with not particularly marked processing capacities. The calculations performed by the neuro-fuzzy networks 16L, 16R and 54 can be carried out using special hardware units, as described in patent application EP-A-1 211 636 and hence without excessive burden on the control unit 6.

Real time updating of the weights used for filtering enables the system to adapt in real time to the existing variations in noise (and/or in useful signal), thus providing a solution that is particularly flexible and reliable over time.

The presence of a unit for monitoring environmental noise, which is able to activate the self-learning network when it detects a variation in the noise enables timely adaptation to the existing conditions, limiting execution of the operations of weight learning and modification only when the environmental condition so requires.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

For instance, training of the acoustic scenario clustering unit may take place also in real time instead of prior to activation of filtering.

Activation of the training step may take place at preset instants not determined by the acoustic scenario clustering unit.

In addition, the correct stream of samples in the spatial filtering unit 3 may be obtained in a software manner by suitably loading appropriate registers, instead of using switches.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A device to filter electrical signals, having a number of input terminals arranged spatially at a distance from one another to supply respective pluralities of input signal samples, and a device output terminal to supply a plurality of filtered signal samples, the device comprising:

a number of signal processing channels, each signal processing channel being formed by a neuro-fuzzy filter to receive a respective plurality of input signal samples and to generate a respective plurality of reconstructed samples;

an adder unit to receive said plurality of reconstructed samples and having an output terminal to supply said plurality of filtered signal samples; and routing means coupled to said output terminal of said adder unit and controllable so as first to supply said filtered signal samples back to said signal processing channels, then to supply said filtered signal samples to said device output terminal, wherein each signal processing channel includes;

a sample input terminal to receive alternately said input signal samples and said filtered signal samples and to supply signal samples to be filtered;

a signal feature computing unit to receive a respective plurality of samples to be filtered and to generate signal features;

a neuro-fuzzy network to receive said signal features and to generate reconstruction weights; and a signal reconstruction unit to receive said samples to be filtered and said reconstruction weights and to generate said reconstructed samples from said samples to be filtered and said reconstruction weights.

2. The device according to claim 1 wherein said signal feature computing unit generates, for each said sample to be filtered:

a first signal feature correlated with a position of a sample to be filtered within an operative sample window;

a second signal feature correlated to a difference between said sample to be filtered and a central sample within said operative sample window; and a third signal feature correlated to a difference between said sample to be filtered and an average sample value within said operative sample window.

3. The device according to claim 1, further comprising a current-weights memory connected to said neuro-fuzzy filters and to store filter weights.

4. The device according to claim 3, further comprising a weight training unit to calculate in real time said filtering weights.

5. The device according to claim 4 wherein said weight training unit comprises:

a training signal supply unit to supply a training signal having a known noise component;

a weight supply unit to supply training weights;

a spatial filtering unit to receive said training signal and said training weights and to output a filtered training signal;

a processing unit to process said training signal and said filtered training signal and to generate a fitness value; and a control unit to repeatedly control said weight training unit and repeatedly receive said fitness value, said control unit being coupled to store the training weights having best fitness value in said current-weights memory.

6. The device according to claim 5 wherein said training signal supply unit includes a noise sample memory to store a plurality of noise samples, and a number of adders, one for each input of said device, each adder being coupled to receive a respective plurality of input signal samples and said noise samples, and to output a respective plurality of training signals.

7. The device according to claim 6, further comprising a switching unit having a number of changeover switch elements, one for each signal processing channel, each changeover switch element having a first input terminal coupled to a respective input terminal of the device, a second input terminal coupled to an output terminal of a respective adder, and an output terminal coupled to a respective signal processing channel.

8. The device according to claim 5 wherein said weight supply unit comprises a random number generator.

9. The device according to claim 6 wherein said processing unit comprises means for computing a fitness degree correlated to a signal-to-noise ratio between said filtered training signal and said noise samples.

10. The device according to claim 5, further comprising a best-fitness memory to store a best-fitness value and a best-weights value, wherein said control unit comprises comparison means for comparing said fitness value supplied by said processing unit and said best-fitness value, and writing means for writing said best-fitness memory with said fitness value, and said best-weight memory with corresponding training weights, in case said fitness value supplied by said processing unit is better than said best-fitness value.

11. The device according to claim 3, further comprising an acoustic scenario change recognition unit to receive said filtered signal samples.

12. The device according to claim 11 wherein said acoustic scenario change recognition unit includes:

a subband-splitting block to receive said filtered signal samples from said device output and to generate a plurality of sets of samples;

a features extraction unit to calculate features of each set of samples;

a neuro-fuzzy network to generate acoustically weighted samples; and a scenario change decision unit to receive said acoustically weighted samples and to output an activation signal for activation of said weight training unit.

13. The device according to claim 12 wherein said subband splitting block includes a plurality of splitting stages in cascade.

14. The device according to claim 13 wherein each said splitting stage includes:

a first and a second filter, in quadrature to each other, to receive a stream of samples to be split and to generate each a respective stream of split samples; and a first and a second downsampler unit, each to receive a respective said stream of split samples.

15. The device according to claim 14 wherein said first filter of said splitting stages is a lowpass filter, and said second filter of said splitting stages is a highpass filter.

16. The device according to claim 12 wherein said feature extraction unit calculates energy of each set of samples.

17. The device according to claim 12 wherein said neuro-fuzzy network comprises:

fuzzification neurons to receive said signal features, and to generate first-layer outputs that define a confidence level of said signal features with respect to membership functions of a triangular type;

fuzzy AND neurons to receive said first-layer outputs and to generate second-layer outputs derived from fuzzy rules; and a defuzzification neuron to receive said second-layer outputs and to generate an acoustically weighted sample for each of said filtered samples, using a gravity-of-gravity criterion.

18. The device according to claim 12 wherein said scenario change decision unit generates said activation signal by digitization at least one of said acoustically weighted samples.

19. The device according to claim 17, further comprising:

a clustering training network having a first input terminal to receive said filtered signal samples from said device output terminal, a second input terminal to receive said acoustically weighted samples, and an output terminal connected to the clustering weights memory, said clustering training network including:

energy calculation means for calculating a mean energy of said filtered signal samples in a preset operative window;

gravity-of-gravity calculating means for determining centers of gravity of said membership functions according to said mean energy, said gravity-of-gravity calculating means being coupled and supplying said centers of gravity to said fuzzification neurons;

random generator means for randomly generating weights for said second-layer and third-layer neurons;

fitness calculation means for calculating a fitness function from said filtered signal samples and target signal samples;

fitness comparison means for comparing said calculated fitness function with a previous stored value;

storage means for storing said fitness function, said centers of gravity and said weights, in case said calculated fitness function is better than said previous stored value; and next-activation means for activating said energy calculation means, said gravity-of-gravity calculation means, said random generator means, said fitness comparison means, and said storage means.

20. A method for filtering electrical signals, comprising:

receiving a plurality of streams of signal samples to be filtered; and generating a plurality of filtered signal samples, wherein said generating includes:

receiving alternately said signal samples to be filtered and feedback filtered signal samples, and supplying these signal samples for filtering;

obtaining signal features for the supplied signal samples;

filtering the supplied signal samples through a respective neuro-fuzzy filter that use the obtained signal features to generate reconstruction weights;

generating a plurality of streams of reconstructed samples based on the reconstruction weights; and adding said plurality of streams of reconstructed samples to obtain added signal samples.

21. The method according to claim 20, further comprising:

supplying said added signal samples to said neuro-fuzzy filters; and repeating said filtering and adding to obtain said filtered signal samples and to output said filtered signal samples.

22. The method according to claim 20, further comprising weight training including:

supplying a training signal having a known noise component;

supplying filtering weights to said neuro-fuzzy filters;

filtering said signal samples to be filtered, to obtain a training filtered signal;

calculating a current fitness value from said training filtered signal samples;

comparing said fitness value with a previous fitness value; and storing said fitness value and said filtering weights if said current fitness value is better than said previous fitness value.

23. The method according to claim 22 wherein said supplying filtering weights comprises randomly generating said filtering weights.

24. The method according to claim 23 wherein said randomly generating said filtering weights, filtering, calculating a current fitness value, comparing, and storing are repeated a preset number of times.

25. The method according to claim 22 wherein said supplying a training signal comprises adding a plurality of noise samples to said filtered signal samples.

26. The method according to claim 22, further comprising recognizing acoustic scenario changes in said filtered signal samples and activating said training.

27. The method according to claim 26 wherein said recognizing comprises:

splitting said filtered signal samples into a plurality of subbands;

filtering said subbands through clustering neuro-fuzzy filters to obtain an acoustically weighted signal; and activating said training if said acoustically weighted signal has a preset value.

28. The method according to claim 27 wherein said splitting includes filtering said subbands using filters having a pass band correlated to bands that are critical for a human ear.

29. The method according to claim 26, further comprising clustering training including:

calculating a mean energy of said filtered signal samples in a preset operative window;

determining centers of gravity of membership functions of said clustering neuro-fuzzy filters according to said mean energy;

calculating a fitness function from said filtered signal samples and target signal samples;

comparing said fitness function with a previous stored value; and storing said fitness function and said centers of gravity, should said calculated fitness function be better than said previous stored value.

30. A system for filtering electrical signals, the system comprising:

means for receiving a plurality of streams of signal samples to be filtered; and means for generating a plurality of filtered signal samples, including:

means for receiving alternately said signal samples to be filtered and feedback filtered signal samples, and for supplying these signal samples for filtering;

means for obtaining signal features for the supplied signal samples;

means for filtering the supplied signal samples through a respective neuro-fuzzy network that use the obtained signal features to generate reconstruction weights;

means for generating a plurality of streams of reconstructed samples based on the reconstruction weights; and means for adding said plurality of streams of reconstructed samples to obtain added signal samples.

31. The system of claim 30, further comprising means for updating filter weights used by the neuro-fuzzy network.

32. The system of claim 30, further comprising means for detecting changes in an acoustic scenario.

33. The system of claim 32, further comprising means for training the means for detecting changes in the acoustic scenario.

34. The method of claim 20 wherein the plurality of streams of signal samples to be filtered are derived from signals received by a plurality of sensors arranged symmetrically relative to a source of the signals.

35. The device according to claim 1 wherein the reconstructed samples generated by the signal reconstruction unit are calculated using equations:

$$oL(i) = \frac{\sum_{j=0}^{2N} oL3L(i-j)\cdot eL(i-j)}{\sum_{j=0}^{2N} eL(i-j)} \text{ and}$$

$$oR(i) = \frac{\sum_{j=0}^{2N} oL3R(i-j)\cdot eR(i-j)}{\sum_{j=0}^{2N} eR(i-j)}, \text{ wherein:}$$

oL(i), oR(i) are the reconstructed samples;

oL3L(i), oL3R(i) are the reconstruction weights;

eL(i), eR(i) are the samples to be filtered; and

N is a position of a central sample in a work window.

36. A device to filter electrical signals, having a number of input terminals arranged spatially at a distance from one another to supply respective pluralities of input signal samples, and a device output terminal to supply a plurality of filtered signal samples, the device comprising:

a number of signal processing channels, each signal processing channel being formed by a neuro-fuzzy filter to receive a respective plurality of input signal samples and to generate a respective plurality of reconstructed samples;

an adder unit to receive said plurality of reconstructed samples and having an output terminal to supply said plurality of filtered signal samples; and at least one routing device coupled to said output terminal of said adder unit and controllable so as first to supply said filtered signal samples back to said signal processing channels, then to supply said filtered signal samples to said device output terminal, wherein each signal processing channel includes a signal feature computing unit to receive a respective plurality of samples to be filtered and to generate signal features, wherein the signal feature computing unit generates for each of said samples to be filtered:

a first signal feature correlated with a position of a sample to be filtered within an operative sample window;

a second signal feature correlated to a difference between said sample to be filtered and a central sample within said operative sample window; and a third signal feature correlated to a difference between said sample to be filtered and an average sample value within said operative sample window.

37. The device according to claim 36, further comprising a signal reconstruction unit in each of the signal processing channels to receive said samples to be filtered and to receive reconstruction weights, and to generate said reconstructed samples from said samples to be filtered and said reconstruction weights, wherein the reconstructed samples generated by the signal reconstruction unit are calculated using equations:

$$oL(i) = \frac{\sum_{j=0}^{2N} oL3L(i-j)\cdot eL(i-j)}{\sum_{j=0}^{2N} eL(i-j)} \text{ and}$$

$$oR(i) = \frac{\sum_{j=0}^{2N} oL3R(i-j)\cdot eR(i-j)}{\sum_{j=0}^{2N} eR(i-j)}, \text{ wherein:}$$

oL(i), oR(i) are the reconstructed samples;

oL3L(i), oL3R(i) are the reconstruction weights;

eL(i), eR(i) are the samples to be filtered; and

N is a position of the central sample in the operative sample window.

* * * * *